United States Patent
Gomyo

(10) Patent No.: US 7,949,212 B2
(45) Date of Patent: May 24, 2011

(54) OPTICAL WAVEGUIDE ELEMENT AND METHOD FOR POLARIZATION SPLITTING

(75) Inventor: Akiko Gomyo, Tokyo (JP)

(73) Assignee: NEC Corporation, Tokyo (JP)

( * ) Notice: Subject to any disclaimer, the term of this patent is extended or adjusted under 35 U.S.C. 154(b) by 0 days.

(21) Appl. No.: 12/522,245

(22) PCT Filed: Oct. 24, 2007

(86) PCT No.: PCT/JP2007/070703
§ 371 (c)(1),
(2), (4) Date: Jul. 6, 2009

(87) PCT Pub. No.: WO2008/084584
PCT Pub. Date: Jul. 17, 2008

(65) Prior Publication Data
US 2010/0074571 A1    Mar. 25, 2010

(30) Foreign Application Priority Data
Jan. 12, 2007    (JP) ................. 2007-004459

(51) Int. Cl.
*G02B 6/26*    (2006.01)
*G02B 6/42*    (2006.01)
*G02B 5/30*    (2006.01)

(52) U.S. Cl. ................ 385/28; 385/11; 385/30; 385/32; 385/43

(58) Field of Classification Search .............. 385/11, 385/27, 28, 30, 32, 41–43
See application file for complete search history.

(56) References Cited

U.S. PATENT DOCUMENTS

| 5,004,447 | A  | * | 4/1991  | Soref ........................... 385/16 |
| 5,165,001 | A  | * | 11/1992 | Takagi et al. ................ 385/42 |
| 5,309,534 | A  | * | 5/1994  | Cohen et al. ................ 385/27 |
| 5,696,856 | A  | * | 12/1997 | Van Der Tol ................ 385/11 |
| 5,818,989 | A  | * | 10/1998 | Nakamura .................... 385/45 |
| 5,946,434 | A  | * | 8/1999  | Lee .............................. 385/45 |
| 6,697,543 | B2 | * | 2/2004  | Miyata et al. ................ 385/11 |
| 6,954,568 | B2 | * | 10/2005 | Liu .............................. 385/45 |
| 7,113,677 | B2 | * | 9/2006  | Doi et al. .................... 385/50 |

(Continued)

FOREIGN PATENT DOCUMENTS

JP    1980062408 A    5/1980

(Continued)

OTHER PUBLICATIONS

International Search Report for PCT/JP2007/070703 mailed Nov. 27, 2007.

(Continued)

*Primary Examiner* — Daniel Petkovsek

(57) ABSTRACT

Disclosed is an optical waveguide element that includes first and second optical waveguides (11, 12) which are formed to have different waveguide modes of guided lights, whose polarized waves are different. First optical waveguide (11) includes directional coupling region (13) and, second optical waveguide (12) includes incident side waveguide (12*a*), which has directional coupling region (13) and which is provided in parallel with first optical waveguide (11), and second optical waveguide (12) includes exit side waveguide (12*b*), which is extended from incident side waveguide (12*a*) and which is bent in the direction that recedes from first optical waveguide (11).

4 Claims, 9 Drawing Sheets

U.S. PATENT DOCUMENTS

| | | | | |
|---|---|---|---|---|
| 7,239,779 B2 * | 7/2007 | Little | ............................... | 385/50 |
| 7,555,180 B2 * | 6/2009 | Bulthuis et al. | ................. | 385/42 |

FOREIGN PATENT DOCUMENTS

| | | | |
|---|---|---|---|
| JP | 1987036608 A | 2/1987 |
| JP | 1987172308 A | 7/1987 |
| JP | 1994018735 A | 1/1994 |
| JP | 1996234028 A | 9/1996 |
| JP | 1997236718 A | 9/1997 |
| JP | 1997281350 A | 10/1997 |

OTHER PUBLICATIONS

I. Kiyat, et al., "A Compact Silicon-on-Insulator Polarization Splitter", IEEE Photonics Technology Letters, vol. 17. No. 1, Jan. 2005, p. 100-102.

A. N. Miliou, et al., "A 1.3-µm Directional Coupler Polarization Splitter by Ion Exchange", Journal of Lightwave Technology, vol. 11, No. 2, Feb. 1993, p. 220-225.

* cited by examiner

OPTICAL WAVEGUIDE ELEMENT AND METHOD FOR POLARIZATION SPLITTING

This application is the National Phase of PCT/JP2007/070703, filed Oct. 24, 2007, which claims priority based on Japanese Patent Application No. 2007-004459 filed on Jan. 12, 2007, the entire contents of which are incorporated herein by reference.

TECHNICAL FIELD

The present invention relates to an optical waveguide element which is for split polarization of a propagating light in e.g., a micro optical waveguide, and a method for polarization splitting.

BACKGROUND ART

A rib or rectangle-like optical waveguide, where an optical waveguide core is formed of a high refractive material and where an optical waveguide clad is formed of a low refractive material between two or more kinds of materials with different refractive indices, has been regarded as a promising technology applied to an optical integrated circuit by a Planer Light Circuit (PLC).

In particular, in an optical waveguide device using a material system having a high refractive index difference, generally, a strong light confinement effect by a photonic band gap can be expected in a light wavelength order of 0.3 μm to 0.7 μm, and applications to various optical elements or micro optical circuits using the same are also expected.

As a conventional waveguide type polarization splitting element, Japanese Laid-Open Patent Publication HEI 9-236718 discloses a construction composed of a single mode type first optical waveguide formed to have a double refractive property, and a single mode type second optical waveguide formed such that its propagation constant is almost equivalent to the propagation constant of a one-side polarization component of the first optical waveguide.

DISCLOSURE

Technical Problem

However, generally, a waveguide mode of a conventional optical waveguide can use only polarized light of a specific direction as the direction of an electromagnetic field vector of a waveguide light. Or, because the waveguide mode exists that is sensitive to the polarized light, an optical waveguide method related to polarization independence has not been established.

Accordingly, it is impossible to control polarization sensitivity of the waveguide light of the micro optical waveguide described above.

An object of the present invention is to provide an optical waveguide element and a method for polarization splitting, which can split the waveguide light of an optical waveguide according to a direction of polarization, by controlling the difference of waveguide modes that are sensitive to the direction of the polarization of the optical waveguide. In addition, another object of the present invention is to provide an optical waveguide element and a method for polarization splitting, which can attain polarization independence of the waveguide light in terms of an entire optical integrated circuit.

Technical Solution

In order to accomplish the above object, an optical waveguide element according to the present invention includes first and second optical waveguides formed to have different waveguide modes of guided lights, whose polarized waves are different. The first optical waveguide includes a directional coupling region. As well, the second optical waveguide includes an incident side waveguide, which has a directional coupling region and which is provided in parallel with the first optical waveguide, and which includes an exit side waveguide, which is extended from the incident side waveguide and which is bent in the direction that recedes from the first optical waveguide.

According to the optical waveguide element so constructed, an one-side polarized light is propagated in the first optical waveguide, and the other-side polarized light is split from the first optical waveguide, and propagated in the exit side waveguide of the second optical waveguide, the polarized lights of an incident light being orthogonal to each other.

In addition, preferably, the first optical waveguide and the second optical waveguide provided in the optical waveguide element according to the present invention have the same waveguide height. This construction is advantageous in a manufacturing process of the optical waveguide element.

Moreover, in the optical waveguide element according to the present invention, although the first optical waveguide and the second optical waveguide have a directional coupling region therebetween, they have different optical waveguide widths that make use of the difference of the waveguide modes of the orthogonal polarized lights.

Further, preferably, the second optical waveguide provided in the optical waveguide element according to the present invention is formed in a taper shape such that a width of the incident side waveguide gradually increases from an incident side to an exit side. In this construction, it is possible to continuously and adiabatically control the waveguide mode.

Furthermore, preferably, reflection suppression means for restricting a reflected light heading from the exit side to the incident side is provided on the incident side of the incident side waveguide of the second optical waveguide provided in the optical waveguide element according to the present invention. Since this construction is intended to reduce a reflection loss, it becomes possible to improve the characteristics of the optical waveguide element.

Still furthermore, a method for polarization splitting according to the present invention splits orthogonal polarization components of a waveguide light incident on a first optical waveguide into a first optical waveguide and a second optical waveguide by means of an optical waveguide element including the first and second optical waveguides which are formed to have different waveguide modes of guided lights, whose polarized waves are different, wherein the first optical waveguide includes a directional coupling region, and the second optical waveguide includes an incident side waveguide, which has a directional coupling region and which is provided in parallel with the first optical waveguide, and which includes an exit side waveguide, which is extended from the incident side waveguide and which is bent in the direction that recedes from the first optical waveguide.

Advantageous Effects

According to the present invention, since polarized wave of a light, which enters as any polarized light, is guided in the first and second optical waveguides, respectively, it can be split into guided lights whose polarized waves are different. Therefore, according to the present invention, it is possible to accomplish polarization independence of the guided light in terms of an entire optical integrated circuit, without accomplishing polarization independence of the optical waveguide itself.

MODE FOR INVENTION

Hereinafter, concrete exemplary embodiments of the present invention will be explained with reference to the drawings.

First Exemplary Embodiment

Figure 1:
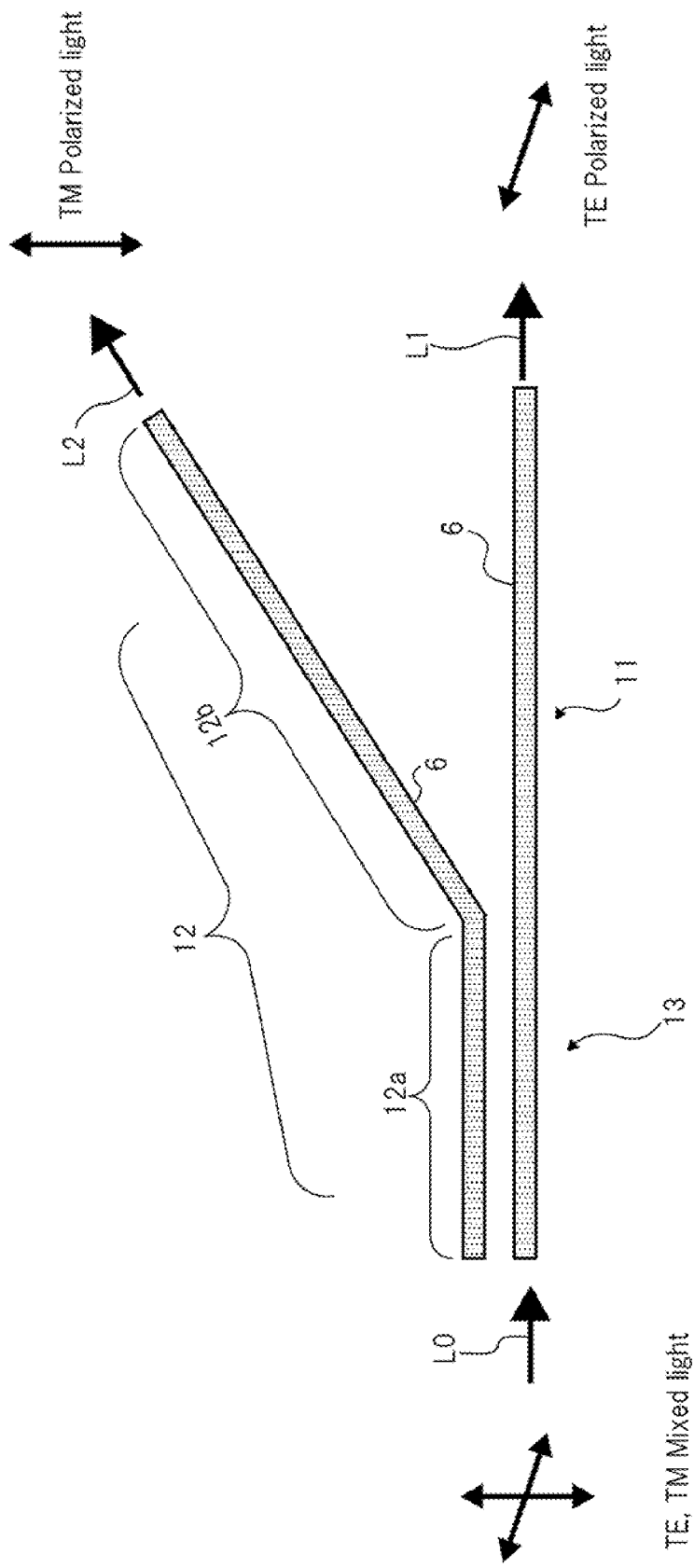
FIG. 1 is a schematic plane view illustrating the construction of an optical waveguide element of a first exemplary embodiment.
Figure 2:
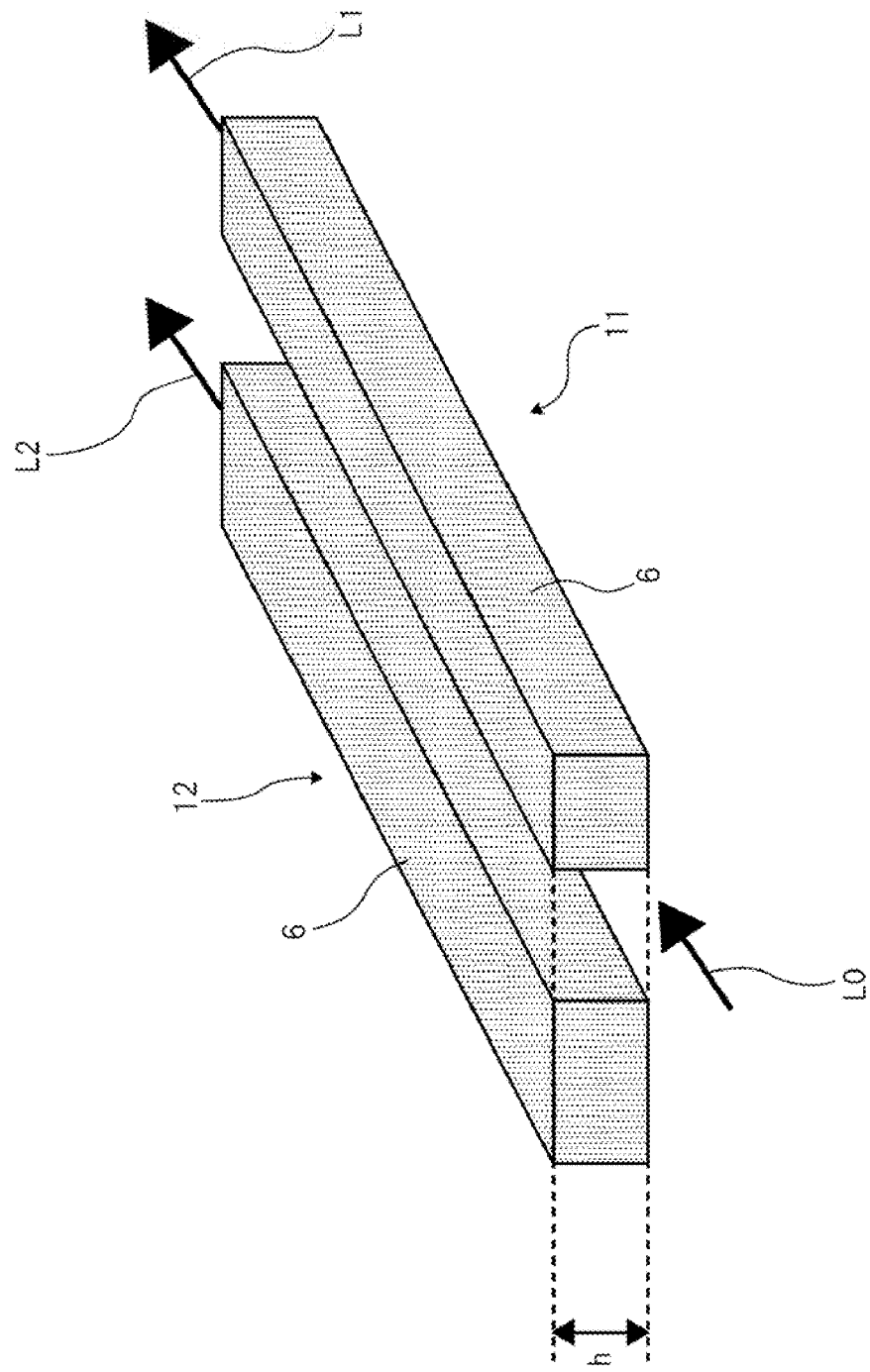
FIG. 2 is a schematic perspective view illustrating optical waveguides.

First of all, an optical waveguide guiding a light in the present invention is shown. A method using optical waveguide modes for guiding light based on the difference of refractive indices is provided as the first exemplary embodiment. FIG. 1 shows a schematic plane view of the optical waveguides, and FIG. 2 shows a schematic perspective view of the optical waveguides.

As illustrated in FIG. 1, an optical waveguide element of this exemplary embodiment, which is a small size polarization splitting element, includes first optical waveguide 11 and second optical waveguide 12 formed such that have different waveguide modes of guided lights, whose polarized waves are different.

First and second optical waveguides 11 and 12 are composed of a waveguide clad (not shown) which is provided on a substrate (not shown), and waveguide core 6 which is provided in the waveguide clad. Meanwhile, although first and second optical waveguides 11 and 12 of this exemplary embodiment are composed of the waveguide clad and the waveguide core having different refractive indices, they may be constructed with only a waveguide core formed of one kind of material.

As shown in FIG. 1, first optical waveguide 11 is formed in a straight line shape, and includes directional coupling region 13. Second optical waveguide 12 includes straight line-shaped incident side waveguide 12a which has directional coupling region 13 and which is provided almost in parallel with first optical waveguide 11, and second optical waveguide 12 includes exit side waveguide 12b which is extended from incident side waveguide 12a and which is bent in the direction that recedes from first optical waveguide 11.

In the optical waveguide element of this exemplary embodiment, orthogonal polarization components of an incident light incident on first optical waveguide 11 are split into first optical waveguide 11 and second optical waveguide 12 by directional coupling region 13, and are exited, respectively.

In addition, the angle of straight line-shaped exit side waveguide 12b of second optical waveguide 12 to straight line-shaped first optical waveguide 11 is over 5 degrees. Since the angle is over 5 degrees, the guided light is split adequately into each direction of polarized wave.

As illustrated in FIG. 2, first optical waveguide 11 and second optical waveguide 12 have same waveguide height h from the principal surface of the substrate (not shown). This construction is advantageous in the manufacturing process of the optical waveguide element.

First, as illustrated in FIG. 1, incident light L0 is introduced into first optical waveguide 11 from an arrow direction of FIG. 1, and guided. Here, as shown in FIG. 1, a direction of an electric field vector of incident light L0 has an electric field vector where TE polarized light, that is parallel to a plane of an optical waveguide circuit, and TM polarized light, that is perpendicular to the TE polarized light, are mixed. The TE polarized light is parallel to the slab surface of the optical waveguide circuit (the principal surface of the substrate which is perpendicular to waveguide height direction h), and is perpendicular to the waveguide direction of light (a vector of the TE polarized light of FIG. 1).

Hereinafter, a mode of a propagating light, when a dominating electric field vector of the propagating light in the slab surface exists in the direction of the TE vector of FIG. 1, is referred to as a TE-like mode. Here, the optical waveguide mode in the slab surface is expressed as a dispersion relation of the TE-like mode in a reciprocal lattice wavenumber space in FIG. 3.

Meanwhile, the TM polarized light is perpendicular to the slab surface of the optical waveguide circuit, and is also perpendicular to the waveguide direction of light (a vector of the TM polarized light of FIG. 1). Hereinafter, the mode of propagating light, when a dominating electric field vector of the propagating light in the slab surface is identical to the direction of the TM vector of FIG. 1, is referred to as a TM-like mode. Here, the TM-like optical waveguide mode in the slab surface is expressed as the dispersion relation of the propagation mode in the reciprocal lattice wavenumber space in FIG. 3.

Figure 3:
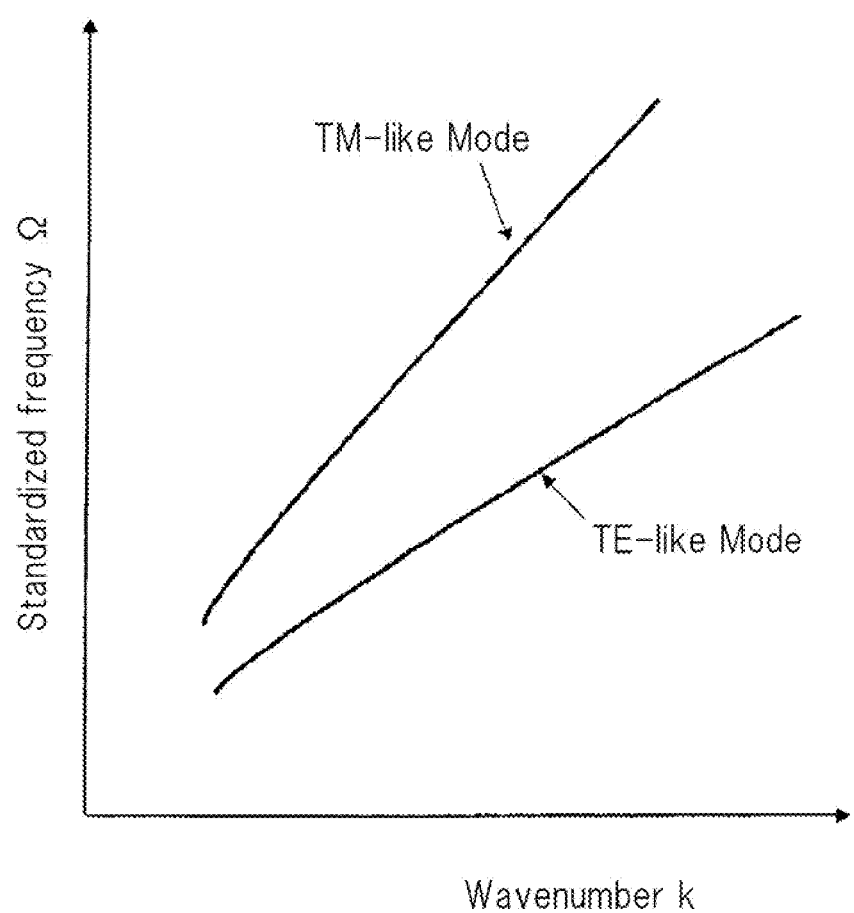
FIG. 3 is a view illustrating dispersion relations by the optical waveguides.

As shown in one example of FIG. 3, generally, the dispersion relations of the TE-like mode and the TM-like mode do not overlap with each other. In the meantime, up-down direction position relations of the respective dispersion relations of the TE-like mode and the TM-like mode can be contrary according to the shapes of the optical waveguides. The light is guided in the optical waveguide by the TE-like mode or the TM-like mode, i.e., a refractive index guide mode. As illustrated in FIG. 1, while incident light L0, that is introduced from first optical waveguide 11, is propagated in incident side waveguide 12a of second optical waveguide 12, which is provided almost in parallel with first optical waveguide 11, only the TE polarized light component exits from the exit end of first optical waveguide 11 as first outgoing light L1. Meanwhile, only the TM polarized light component of incident light L0 exits from the exit end of second optical waveguide 12 as second outgoing light L2.

Figure 4:
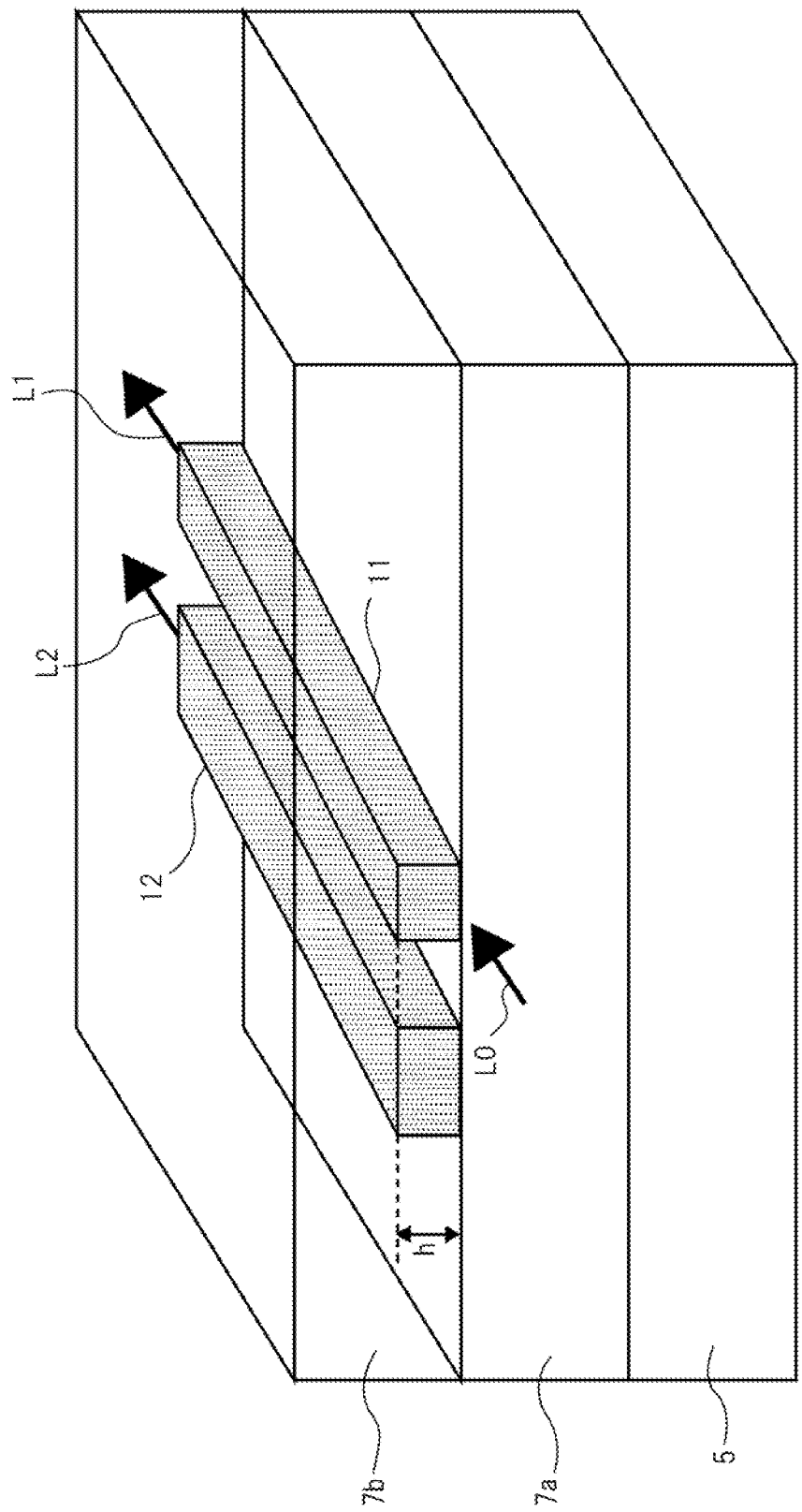
FIG. 4 is a schematic perspective view illustrating another example of the optical waveguide element of the first exemplary embodiment.

Then, another example of the first exemplary embodiment will be explained. Like the foregoing example, this example uses a refractive index guide mode in an optical waveguide. As shown in FIG. 4, in the optical waveguide, a waveguide clad includes lower clad layer 7a which is provided on substrate 5, and includes upper clad layer 7b which is stacked on lower clad layer 7a. Waveguide core 6 is provided on lower clad layer 7a and covered with upper clad layer 7b. In a case where first and second optical waveguides 11 and 12 are constructed like this, it is possible to perform the polarization splitting as in the construction of FIG. 1.

Figure 5:
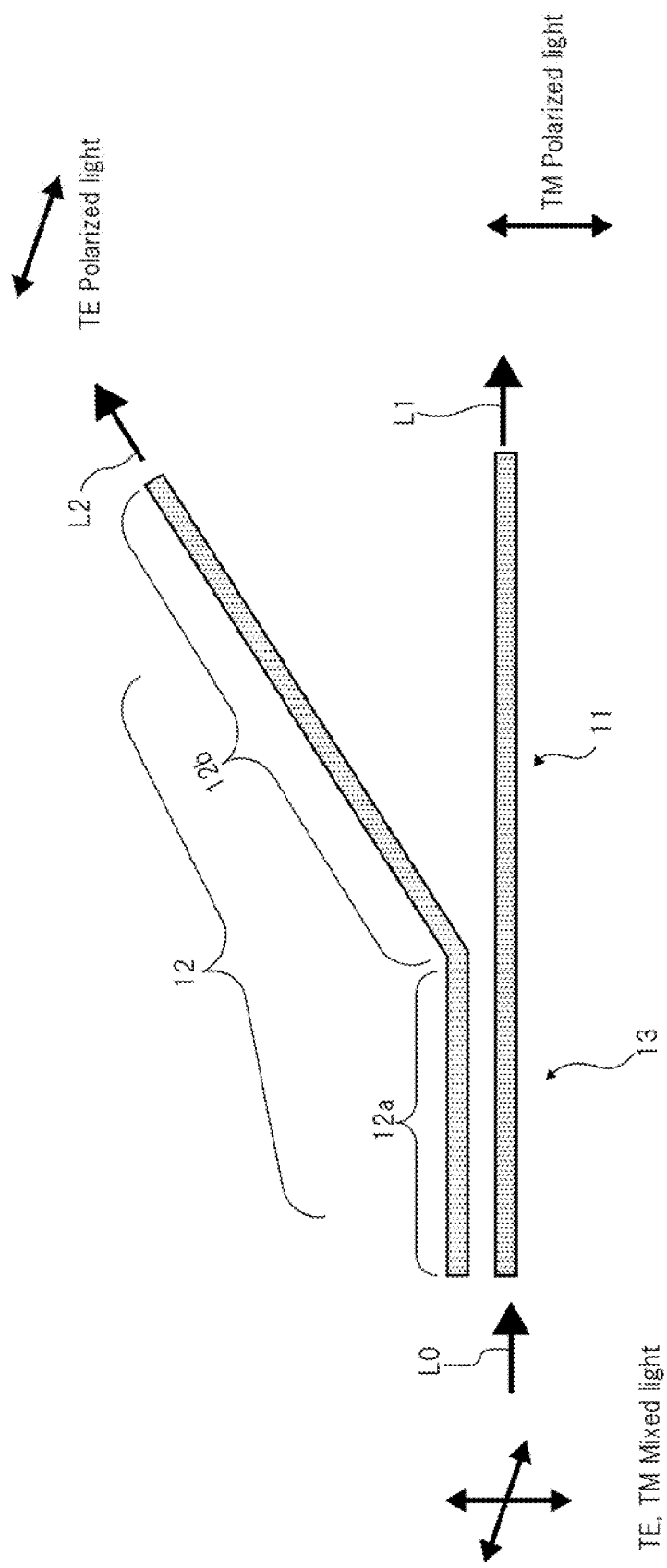
FIG. 5 is a schematic plane view illustrating a further example of the optical waveguides of the first exemplary embodiment.

In addition, a further example of the first exemplary embodiment will be explained. As illustrated in FIG. 5, the direction of the electric field vector of incident light L0 is a mixed direction of the TE polarized light and a TM polarized light. Moreover, it is perpendicular to the slab surfaces of first and second optical waveguides 11 and 12, and is also perpendicular to the waveguide direction of the light (an electric field vector of incident light L0 of FIG. 5). In the example shown in FIG. 5, while incident light L0, that is introduced from first optical waveguide 11, is propagated in incident side waveguide 12a of second optical waveguide 12, which is provided almost in parallel with first optical waveguide 11, only the TE polarized light component exits from the exit end of first optical waveguide 11 as first outgoing light L1. In the meantime, only the TM polarized light component of incident light L0 incident from first optical waveguide 11 exits from the exit end of exit side waveguide 12b of second optical waveguide 12 as second outgoing light L2.

Thereafter, a guiding state of the first exemplary embodiment will be explained. First of all, in the optical waveguide, when the direction of the electric field vector of the waveguide light is parallel to the slab surface of the optical waveguide, light is guided in the optical waveguide according to the refractive index guide mode of the TE-like mode. In addition, when the direction of the electric field vector of the waveguide light is perpendicular to the slab surface of the optical waveguide, light is guided in the optical waveguide according to the refractive index guide mode of the TM-like mode. As set forth above, the optical waveguide element of this exemplary embodiment can guide two lights that mainly have the electric field vectors toward the respective two directions in optical waveguides 11 and 12, while maintaining almost the identical optical intensity. That is, the optical waveguides are formed such that the mutual waveguide modes exist in the same frequency zone in the TE-like mode and in the TM-like mode.

Concretely, it can be achieved by adjusting the TE-like mode and the TM-like mode with respect to the dispersion relations of first optical waveguide 11 and second optical waveguide 12, respectively, by using the structure of the optical waveguide, the difference of the refractive indices of the two kinds of materials of the core layer and the clad layer, and waveguide height h as parameters.

In an optical waveguide element, e.g., an Si/SiO$_2$/Si (SOI) substrate is used, the thickness of the Si layer which is the topmost layer is set as about 0.25 μm, and the thickness of the SiO$_2$ layer is set as about 1 μm. First optical waveguide 11 and second optical waveguide 12 are formed as rectangular optical waveguides having a waveguide width of 0.3 μm to 0.45 μm. The lengths of first optical waveguide 11 and second optical waveguide 12 are set within the range of e.g., about 20 μm to 200 μm. In addition, the interval between first optical waveguide 11 and second optical waveguide 12 is set within the range of about 0.3 μm to 0.7 μm. This construction ensures the aforementioned characteristics.

Moreover, in an optical waveguide, when the direction of the electric field vector of the waveguide light is parallel to the slab surface of the optical waveguide, light is guided in the optical waveguide according to a refractive index guide mode of a TE-like mode. Further, when the direction of the electric field vector of the waveguide light is perpendicular to the slab surface of the optical waveguide, light is guided in the optical waveguide by the refractive index guide mode of a TM-like mode.

As described above, it is possible to guide two lights that mainly have the electric field vectors toward the respective two directions in the optical waveguides, while maintaining almost the identical optical intensity. That is, first and second optical waveguides 11 and 12 are formed such that mutual waveguide modes exist in the same frequency zone in the TE-like mode and in the TM-like mode. Concretely, it can be achieved by adjusting the TE-like mode and the TM-like mode with respect to the dispersion relations of first optical waveguide 11 and second optical waveguide 12, respectively, by using the structure of an optical waveguide, the difference of refractive indices of two kinds of materials of a core layer and a clad layer, and waveguide height h as parameters.

In an optical waveguide element, e.g., an Si/SiO$_2$/Si (SOI) substrate is used, the thickness of the Si layer which is the topmost layer is set as about 0.25 μm, and the thickness of the SiO$_2$ layer is set as about 1 μm. The SiO$_2$ layer having a thickness of about 1 μm is furthermore covered on the Si layer. First optical waveguide 11 and second optical waveguide 12 are formed as rectangular optical waveguides having a waveguide width of about 0.3 μm to 0.45 μm. The lengths of first and second optical waveguides 11 and 12 range from e.g., about 20 μm to 200 μm.

Meanwhile, when the lengths of first optical waveguide 11 and second optical waveguide 12 are below 20 μm, since the above-described splitting function is not sufficiently obtained, the characteristics of the optical waveguide element are unpreferably degraded. In addition, the interval between first optical waveguide 11 and second optical waveguide 12 ranges from about 0.3 μm to 0.7 μm. This construction ensures the aforementioned characteristics.

Then, an experimental result of the first exemplary embodiment will be explained. The triangular lattice hole type photonic crystal line defect optical waveguide using an Si slab was manufactured by means of photonic crystals, and transmission characteristics thereof were measured.

First of all, in a case where the direction of the electric field vector of a waveguide light was parallel to the photonic crystal slab surface, light was propagated in the photonic crystal line defect waveguide according to the line defect waveguide mode of a TE-like mode around an optical communication wavelength of 1550 nm. Here, as the measurement result of a transmission spectrum, a level of a transmitted light was about −20 dB. This was because the coupling loss of the optical fiber and light was about −110 dB in the input and output of the photonic crystal waveguide, respectively. That is, according to the first exemplary embodiment, while light was guided in the photonic crystal line defect optical waveguide, its propagation loss was seldom generated.

Here, after the direction of the electric field vector of the waveguide light was rotated by 90 degrees to be perpendicular to the photonic crystal slab surface, transmission characteristics of the photonic crystal line defect optical waveguide were measured. In this construction, as a measurement result of the transmission spectrum, light was guided in the photonic crystal line defect optical waveguide at a transmitted light level that was almost equivalent to the foregoing level around a communication wavelength of 1550 nm.

In this case, light was guided in the photonic crystal line defect optical waveguide according to a refractive index guide mode of a TM-like mode. As described above, the waveguide light in the photonic crystal line defect optical waveguide using the Si slab can attain polarization independence. In this exemplary embodiment, an air bridge structure that uses an Si layer and that forms both sides of the slab surface with air layers was used as the photonic crystal slab. Meanwhile, the same effect can be achieved by means of a structure that uses an Si layer and that fills $SiO_2$ in both sides of the slab surface and in the photonic crystal holes as the photonic crystal slab.

As set forth above, according to the optical waveguide element of this exemplary embodiment, it becomes possible to split polarization of a light, being arbitrary polarized light and propagated in first optical waveguide 11, into a TE-like polarized light and a TM-like polarized light according to first and second optical waveguides 11 and 12, respectively.

In addition, according to the optical waveguide element of this exemplary embodiment, it is possible to accomplish this function in an extremely small size of about 20 μm to 200 μm, which is suitable for an element size. In the optical waveguide of this exemplary embodiment, it becomes possible to reduce a risk regarding polarized light in the entire micro optical integrated circuit by means of this function, without attaining polarization independence of the waveguide itself. Consequently, it is possible to accomplish polarization independence of the micro optical integrated circuit.

Hereinafter, optical waveguide elements of other exemplary embodiments will be explained respectively. In the meantime, since first optical waveguides of the optical waveguide elements of other exemplary embodiments are identical in construction to that of the foregoing first exemplary embodiment, the same reference numerals are used and explanations thereof are omitted.

Second Exemplary Embodiment

Figure 6:
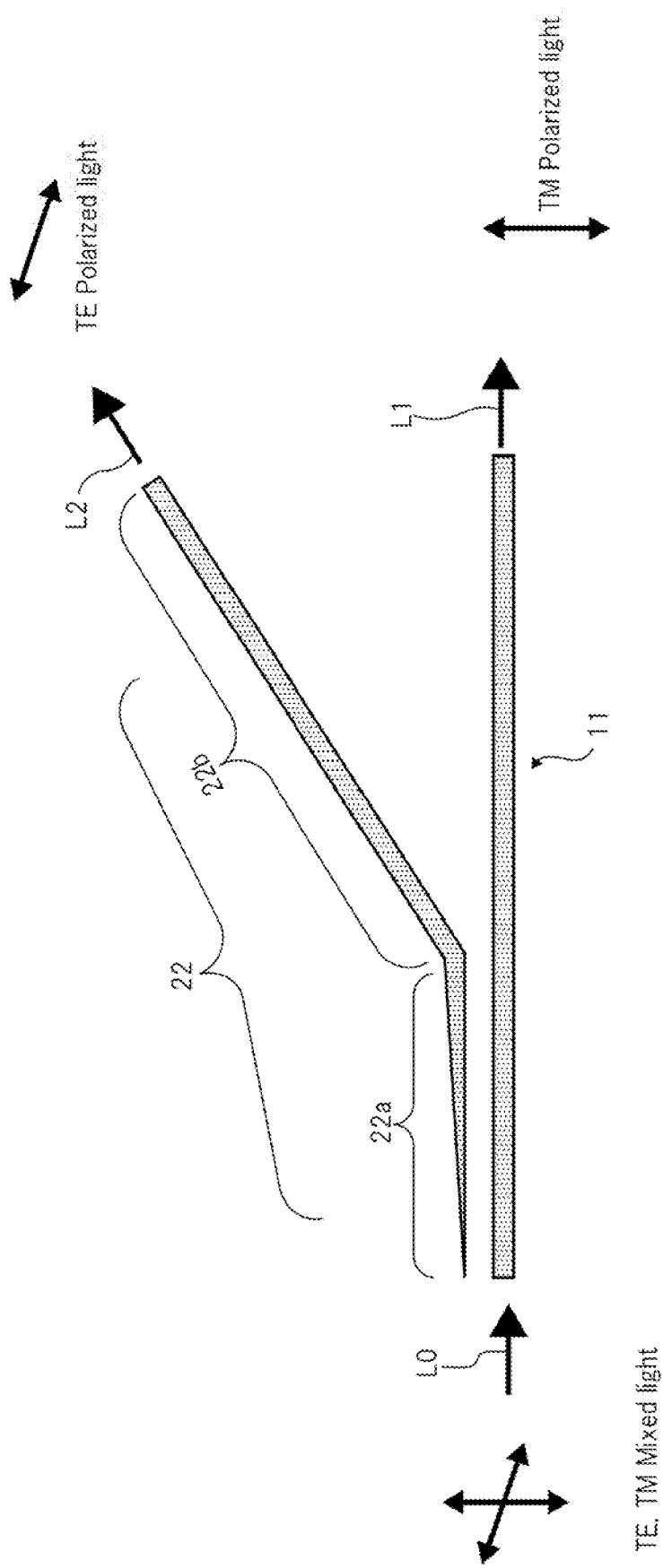
FIG. 6 is a schematic plane view illustrating a construction where an incident side waveguide of a second optical waveguide is formed in a taper shape in an optical waveguide element of a second exemplary embodiment.

Next, the second exemplary embodiment will be explained with reference to the drawings. As illustrated in FIG. 6, the optical waveguide element of this exemplary embodiment includes first optical waveguide 11 and second optical waveguide 22. Second optical waveguide 22 includes straight line-shaped incident side waveguide 22a, which has directional coupling region 13 and which is provided almost in parallel with first optical waveguide 11, and second optical waveguide 22 includes straight line-shaped exit side waveguide 22b, which is extended from incident side waveguide 22a and which is bent in the direction that recedes from first optical waveguide 11.

As well, incident side waveguide 22a of second optical waveguide 22 is formed in a so-called taper shape such that its width gradually increases from the incident end to the exit end. In this exemplary embodiment, as in first optical waveguide 11 and second optical waveguide 12 of the foregoing first exemplary embodiment, a TE-like polarized light or a TM-like polarized light can be split into the respective optical waveguides and outputted as outgoing lights. In this exemplary embodiment, since incident side waveguide 22a of second optical waveguide 22 is formed in a taper shape, it does not have a single waveguide mode but shows light propagation of a gradually changed waveguide mode.

Accordingly, in this exemplary embodiment, since it is easy to conduct an adjustment such that it effects a difference of propagation states between the TM-like polarized light and the TE-like polarized light, it becomes easy to split the TM-like polarized light or the TE-like polarized light into either first optical waveguides 11 or second optical waveguides 22.

Figure 7:
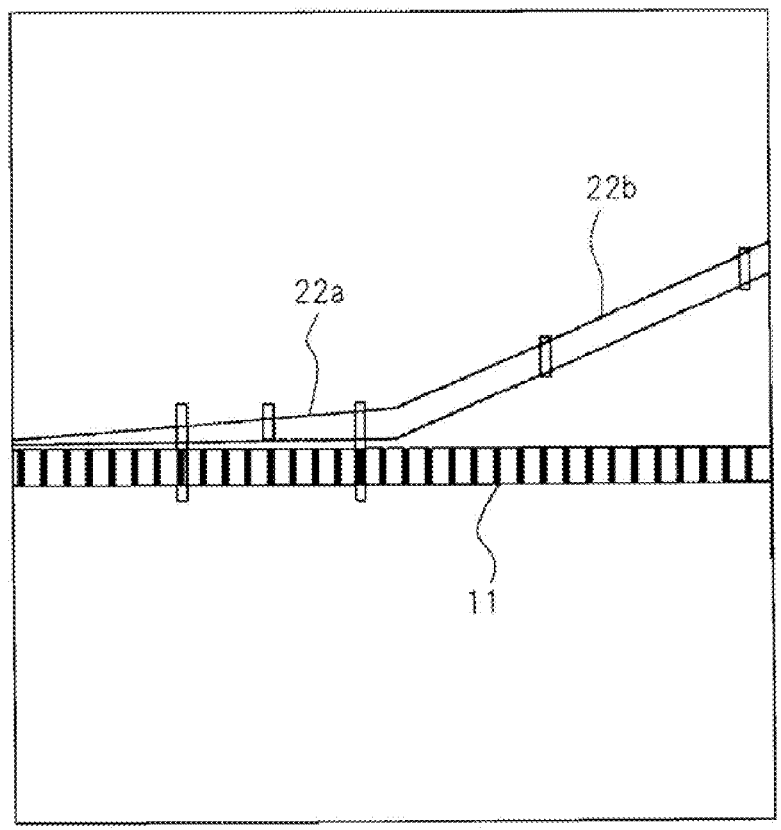
FIG. 7 is a view illustrating electromagnetic field distribution by three-dimensional electromagnetic field calculation.

Thereafter, the guiding state of the second exemplary embodiment will be explained. Represented is an example calculation of a sample having an Si core and $SiO_2$ clad buried structure as first and second optical waveguides 11 and 22, with respect to a structure for forming incident side waveguide 22a of second optical waveguide 22 in a taper shape as described above. FIG. 7 shows actual electromagnetic field distribution using three-dimensional calculation. According to this exemplary embodiment, as illustrated in FIG. 7, a TE polarized light incident and propagated from an incident end of incident side waveguide 22a forming an acute angle shape at a wavelength of near 1550 nm has an electric field distribution that is seldom scattered just in first optical waveguide 11, and is propagated as an outgoing light. As explained above, it is possible to split only the TE-like polarized light.

Third Exemplary Embodiment

Figure 8:
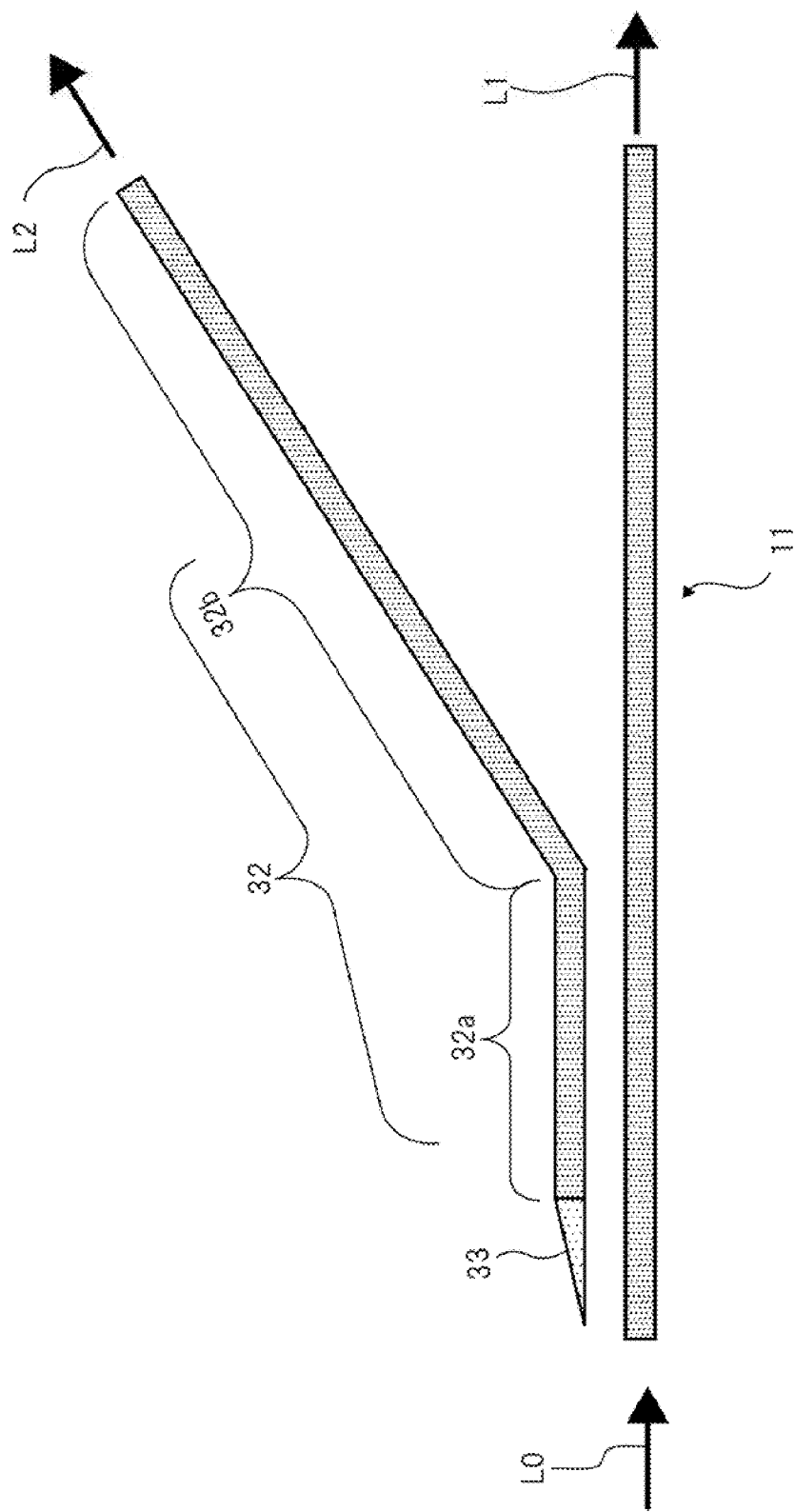
FIG. 8 is a schematic plane view illustrating a construction where a reflection suppression unit is provided in a second optical waveguide in an optical waveguide element of a third exemplary embodiment.

Next, an optical waveguide element of the third exemplary embodiment will be explained. As illustrated in FIG. 8, in this exemplary embodiment, as in the foregoing first exemplary embodiment, the optical waveguide element includes first optical waveguide 11 and second optical waveguide 32. Second optical waveguide 32 includes straight-line shaped incident side waveguide 32a, which has directional coupling region 13 and which is provided almost in parallel with first optical waveguide 11, and second optical waveguide 32 includes straight line-shaped exit side waveguide 32b, which is extended from incident side waveguide 32a and which is bent in the direction that recedes from first optical waveguide 11.

And, as shown in FIG. 8, a reflection suppression unit 33 which is reflection suppression means for restricting reflected light heading from an exit side to an incident side is bonded to the incident end of incident side waveguide 32a of second optical waveguide 32 so as to reduce the reflection loss of a waveguide light propagated in incident side waveguide 32a. Reflection suppression unit 33 is formed in a triangular shape such that its width gradually increases from an incident side of the incident light to the exit side.

According to this exemplary embodiment, since reflection suppression unit 33 is provided at the incident end of second optical waveguide 32, when the incident light is coupled to second optical waveguide 32, it is possible to restrict reflection of light in the opposite direction to the proceeding direction of the incident light. Therefore, according to this exemplary embodiment, a loss caused by reflection of the light is restricted, because the light is propagated in the opposite direction to the light incident direction in second optical waveguide 32. That is, according to this exemplary embodiment, as well as the foregoing first exemplary embodiment, reflection suppression unit 33 makes it possible to acquire a polarized light splitting characteristic, and to reduce loss of propagation light.

Figure 9:
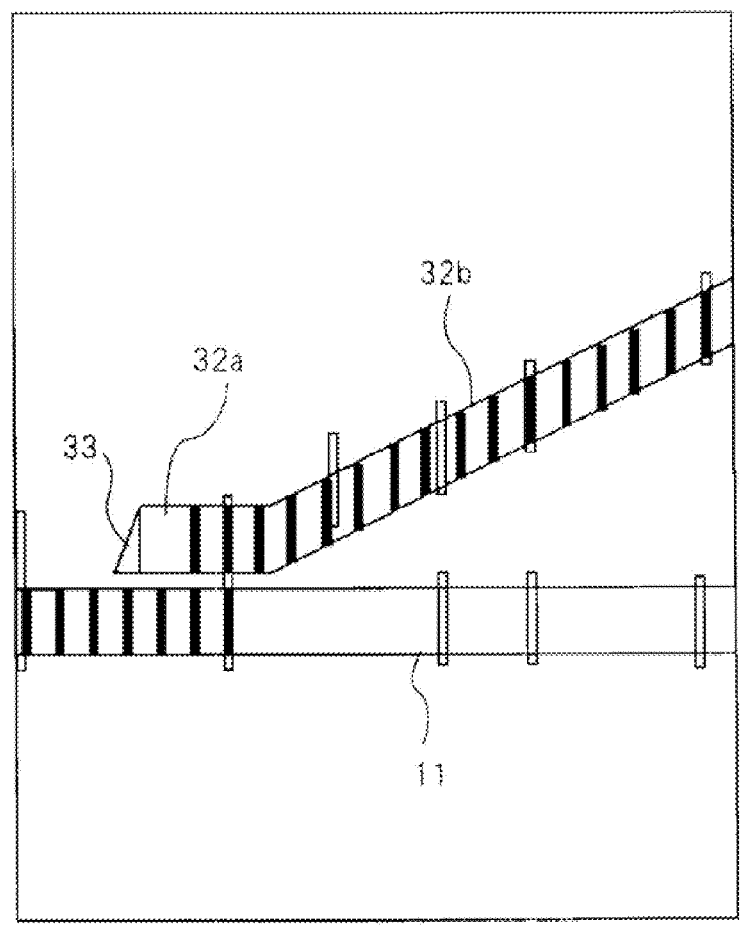
FIG. 9 is a view illustrating electromagnetic field distribution by three-dimensional electromagnetic field calculation.

Thereafter, the guiding state of the third exemplary embodiment will be explained. Represented is an example calculation of a sample having an Si core and $SiO_2$ clad structure as first and second optical waveguides 11 and 32 respectively, with respect to a structure for providing triangular reflection suppression unit 33 at the incident end of second optical waveguide 32 as described above. FIG. 9 shows actual electromagnetic field distribution using three-dimensional calculation. According to this exemplary embodiment, as illustrated in FIG. 9, TM polarized light incident and propagated from the incident end of second optical waveguide 32 at a wavelength of near 1550 nm almost travels through incident side waveguide 32*a* of second optical waveguide 32, and is propagated as an outgoing light toward exit side waveguide 32*b* of second optical waveguide 32 without scattering the electric field distribution. As explained above, according to this exemplary embodiment, it is possible to split only the TM-like polarized light.

While the present invention has been described with reference to the exemplary embodiments, the present invention is not limited thereto. Therefore, it will be understood by those skilled in the art that various modifications and changes can be made to the construction or details of the present invention within the scope of the present invention.

The invention claimed is:

1. An optical waveguide element, comprising first and second optical waveguides formed to have different waveguide modes of guided lights, whose polarized waves are different, wherein the first optical waveguide includes a directional coupling region, and the second optical waveguide includes an incident side waveguide, which has the directional coupling region and which is provided in parallel with the first optical waveguide, and the second optical waveguide includes an exit side waveguide, which is extended from the incident side waveguide and which is bent in the direction that recedes from the first optical waveguide, the second optical waveguide is formed in a taper shape such that a width of the incident side waveguide gradually increases from an incident side to an exit side, reflection suppression means for restricting a reflected light heading from an exit side to an incident side is provided on the incident side of the incident side waveguide of the second optical waveguide, the reflection suppression means is formed in a taper shape such that a width of the second optical waveguide gradually increases from the incident side of the second optical waveguide to the exit side, and the reflection suppression means is formed in a taper shape such that the incident side of the second optical waveguide forms an acute angle shape, and is positioned in the directional coupling region, a gap between the first optical waveguide and the second optical waveguide is not changed in the portion where the reflection suppression means is positioned, and a gap between the exit side waveguide of the second optical waveguide and the first optical waveguide gradually increases from the incident side of the second optical waveguide to the exit side.

2. The optical waveguide element of claim 1, wherein the reflection suppression means is formed such that a width of the waveguide gradually increases in proportion to a longitudinal direction distance of the directional coupling region.

3. The optical waveguide element of claim 1, wherein the taper shape of the reflection suppression means is such that a taper-shaped portion of the reflection suppression means is positioned in an inner side of the directional coupling region.

4. The optical waveguide element of claim 3, wherein the taper-shaped portion being positioned in the inner side of the directional coupling region provides for restriction of reflection of the guided lights in an opposite direction to an original direction of the guided lights.

* * * * *